US012783806B2

(12) United States Patent
Nguyen

(10) Patent No.: US 12,783,806 B2
(45) Date of Patent: Nov. 3, 2026

(54) COMPUTER-READABLE RECORDING MEDIUM STORING LANGUAGE PROCESSING PROGRAM, LANGUAGE PROCESSING APPARATUS, AND LANGUAGE PROCESSING METHOD

(71) Applicant: Fujitsu Limited, Kawasaki (JP)

(72) Inventor: An Le Nguyen, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 18/791,803

(22) Filed: Aug. 1, 2024

(65) Prior Publication Data

US 2025/0094719 A1 Mar. 20, 2025

(30) Foreign Application Priority Data

Sep. 14, 2023 (JP) ................................ 2023-148961

(51) Int. Cl.
*G06F 40/295* (2020.01)
*G06F 40/58* (2020.01)

(52) U.S. Cl.
CPC ............ *G06F 40/295* (2020.01); *G06F 40/58* (2020.01)

(58) Field of Classification Search
CPC ......... G06F 40/295; G06F 40/58; G06F 40/45
See application file for complete search history.

(56) References Cited

U.S. PATENT DOCUMENTS 8,560,298 B2 * 10/2013 Kumaran .............. G06F 40/129 704/4
2008/0126076 A1 * 5/2008 Ming ...................... G06F 40/45 704/4
2010/0057432 A1 3/2010 Hua et al.
2015/0248401 A1 9/2015 Ruvini et al.
2018/0253421 A1 9/2018 Ruvini et al.
2021/0166135 A1 6/2021 Tamura et al.
2021/0271813 A1 * 9/2021 Cao ......................... G06F 40/45

(Continued)

FOREIGN PATENT DOCUMENTS

JP 2010-61643 A 3/2010
JP 2017-151678 A 8/2017

OTHER PUBLICATIONS

Irvine, Ann et al., "Combining Bilingual and Comparable Corpora for Low Resource Machine Translation", Proceedings of the Eighth Workshop on Statistical Machine Translation, pp. 262-270, Aug. 8-9, 2013.

(Continued)

*Primary Examiner* — Stella L. Woo
(74) *Attorney, Agent, or Firm* — Fujitsu Intellectual Property Center

(57) ABSTRACT

A non-transitory computer-readable recording medium stores a language processing program for causing a computer to execute a process including: extracting, from a second text written in a second language, a second named entity corresponding to a first named entity contained in a first text written in a first language; associating the first text with the second text based on a similarity between the first named entity and the second named entity and an alignment probability between the first named entity and the second named entity; and outputting association information indicating a result of associating the first text with the second text.

12 Claims, 6 Drawing Sheets

(56) References Cited

U.S. PATENT DOCUMENTS

2023/0153542 A1* 5/2023 Niu .......................... G06F 40/45
704/8

OTHER PUBLICATIONS

Ramesh, Sree Harsha et al., "Neural Machine Translation for Low Resource Languages using Bilingual Lexicon Induced from Comparable Corpora", Proceedings of NAACL-HLT 2018: Student Research Workshop, pp. 112-119, Jun. 2-4, 2018.

Gregoire, Francis et al., "Extracting Parallel Sentences with Bidirectional Recurrent Neural Networks to Improve Machine Translation", Proceedings of the 27th International Conference on Computational Linguistics, pp. 1442-1453, Aug. 20-26, 2018.

* cited by examiner

COMPUTER-READABLE RECORDING MEDIUM STORING LANGUAGE PROCESSING PROGRAM, LANGUAGE PROCESSING APPARATUS, AND LANGUAGE PROCESSING METHOD

CROSS-REFERENCE TO RELATED APPLICATION

This application is based upon and claims the benefit of priority of the prior Japanese Patent Application No. 2023-148961, filed on Sep. 14, 2023, the entire contents of which are incorporated herein by reference.

FIELD

The embodiment discussed herein is related to a language processing technique.

BACKGROUND

A parallel corpus is a corpus in which sentences in different languages related in parallel translation are associated with each other in a parallel text alignment. A comparable corpus is a corpus in which documents in different languages concerning the same topic are associated with each other.

Japanese Laid-open Patent Publication No. 2017-151678 is disclosed as related art.

A. Irvine et al., "Combining Bilingual and Comparable Corpora for Low Resource Machine Translation", Proceedings of the Eighth Workshop on Statistical Machine Translation, pages 262-270, 2013, and S. H. Ramesh et al., "Neural Machine Translation for Low Resource Languages using Bilingual Lexicon Induced from Comparable Corpora", Proceedings of NAACL-HLT 2018: Student Research Workshop, pages 112-119, 2018, F. Gregoire et al., "Extracting Parallel Sentences with Bidirectional Recurrent Neural Networks to Improve Machine Translation", Proceedings of the 27th International Conference on Computational Linguistics, pages 1442-1453, 2018 are also disclosed as related art.

SUMMARY

According to an aspect of the embodiments, a non-transitory computer-readable recording medium stores a language processing program for causing a computer to execute a process including: extracting, from a second text written in a second language, a second named entity corresponding to a first named entity contained in a first text written in a first language; associating the first text with the second text based on a similarity between the first named entity and the second named entity and an alignment probability between the first named entity and the second named entity; and outputting association information indicating a result of associating the first text with the second text.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
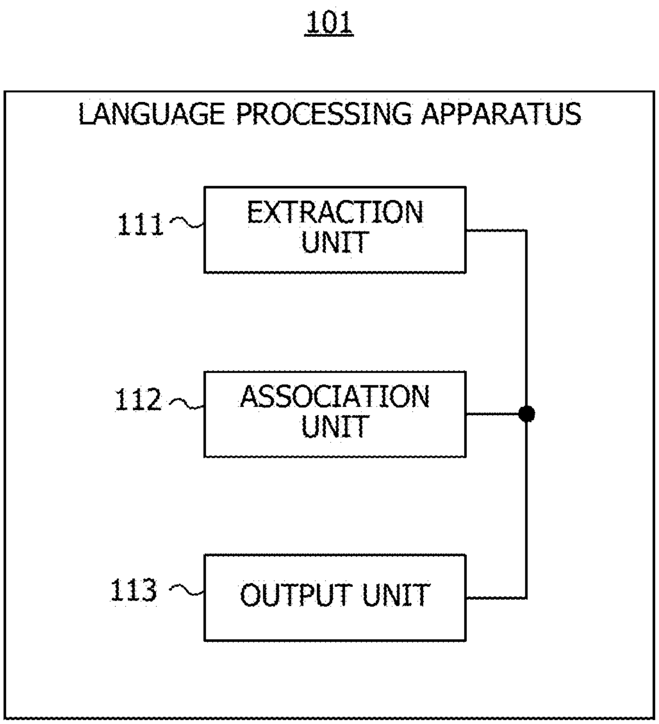
FIG. 1 is a functional configuration diagram of a language processing apparatus in an embodiment.

Paired documents in the comparable corpus are not perfectly related in parallel translation as in the parallel corpus. Articles in Wikipedia (registered trademark) written in multiple languages are an example of the comparable corpus.

A parallel corpus contains important data useful in machine translation. However, to construct a parallel corpus involves a lot of human's work for translation and checking and the workload for the construction is great. For this reason, a parallel corpus is a scarce resource that is hard to get. A parallel corpus in an expert domain such as a scientific field has a higher rarity because the parallel corpus in the expert domain has to be constructed based on expert knowledge.

Among languages, there is a large gap in existing parallel corpus resource. In major European languages such as English and French, there are relatively many parallel corpora. On the other hand, in low-resource languages, there are few or no parallel corpora. The low-resource language is a language in which only a small amount of data has been accumulated so far, such as Basque, Japanese, Arabic, Tamil, Thai, and Indonesian.

Regarding a parallel corpus, a technique is known in which a comparable corpus is used for machine translation in a low-resource language. A technique for extracting parallel sentences by using a bidirectional recurrent neural network is also known. There is also known a topic inferring apparatus for assigning crosslingual topics to documents or words in non-parallel corpora associated in a document level.

When paired sentences that may be related in parallel translation are extracted based on semantic similarities between the sentences in order to generate a parallel corpus from a comparable corpus, the extracted paired sentences do not indicate the same semantic content in some cases.

Such a problem occurs not only when a parallel corpus is generated from a comparable corpus but also when various texts written in different languages are compared.

According to one aspect, an object of the present disclosure is to associate multiple texts written in different languages with each other with high accuracy.

Hereinafter, an embodiment will be described in detail with reference to the drawings.

According to the techniques described in Irvine, Ramesh, and Gregoire, a semantic similarity between sentences is calculated, and paired sentences that may be related in parallel translation are extracted based on the calculated semantic similarity. The semantic similarity is a similarity between the meanings in sentences, and is different from a lexical similarity like a similarity between words in a translation dictionary. As the semantic similarity, for example, a similarity between contexts or a similarity between sentence vectors generated from sentences is used.

However, even when sentences have a high semantic similarity, the sentences do not indicate the same semantic content in some cases. For this reason, when a parallel corpus in which sentences are associated with each other is generated based only on the semantic similarities, the parallel corpus may have low accuracy.

As an example, the following English sentence E1 and Japanese sentence J1 are compared.

E1 Biomedical is so easy.

J1 遺伝学はとても楽なものです。(Genetics is so easy.)

In this case, the degree of context similarity between the English sentence E1 and the Japanese sentence J1 is 0.8, which is a relatively high value. However, the semantic content of the English sentence E1 is "Biomedical is so easy", which is different from the semantic content in the Japanese sentence J1.

As another example, the following English sentence E2 and Japanese sentence J2 are compared.

E2 We report a rare case of ischemic heart disease.

J2 Soul Disorder のカセットを限定発売します。(We release a Soul Disorder cassette in a limited quantity.)

In this case, the similarity between the sentence vector of the English sentence E2 and the sentence vector of the Japanese sentence J2 is 0.7, which is a relatively high value. However, the semantic content of the English sentence E2 is "We report a rare case of ischemic heart disease", which is different from the semantic content in the Japanese sentence J2.

To address this, in the embodiment, paired sentences are compared by using not only the semantic similarity between the sentences but also a similarity between named entities (NE) contained in the sentences. NE means a proper noun, a time expression, a numerical expression, or the like. The proper nouns include an organization name (ORGANIZATION), a person name (PERSON), a place name (LOCATION), and a proper artifact name (ARTIFACT). The time expressions include a date expression (DATE) and a time point expression (TIME), and the numerical expressions include a monetary expression (MONEY) and a percentage expression (PERCENT).

As the number of NEs corresponding to each other between sentences in different languages increases, the possibility that the sentences indicate the same semantic content becomes higher. For this reason, by comparing sentences using the similarity between NEs, two sentences indicating the same semantic content may be associated with each other with high accuracy.

FIG. 1 illustrates a functional configuration example of a language processing apparatus in the embodiment. A language processing apparatus 101 in FIG. 1 includes an extraction unit 111, an association unit 112, and an output unit 113.

Figure 2:
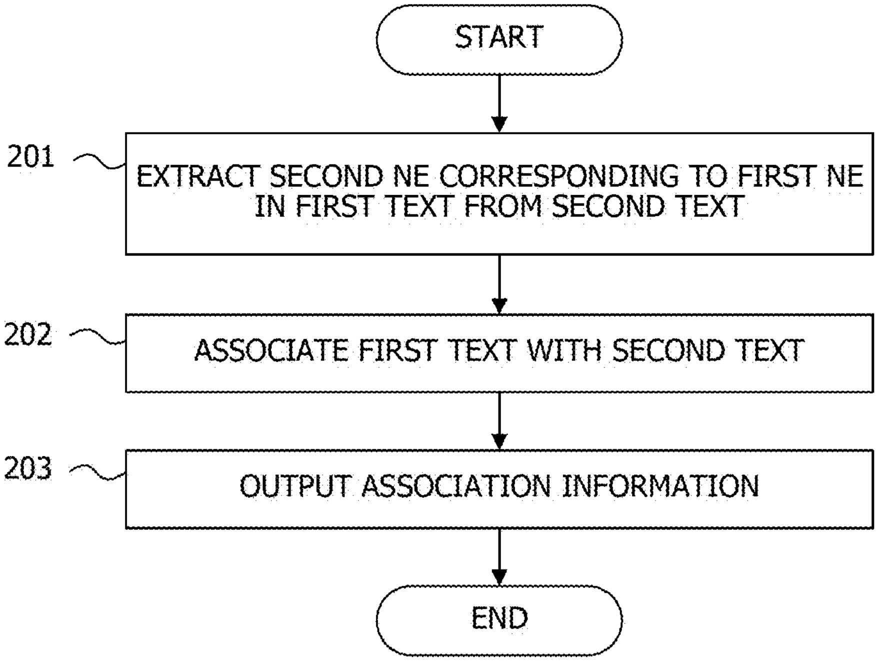
FIG. 2 is a flowchart of first language processing.

FIG. 2 is a flowchart illustrating an example of first language processing performed by the language processing apparatus 101 in FIG. 1. First, the extraction unit 111 extracts, from a second text written in a second language, a second NE corresponding to a first NE contained in a first text written in a first language (step 201).

Next, the association unit 112 associates the first text with the second text based on the similarity between the first NE and the second NE and an alignment probability between the first NE and the second NE (step 202). The output unit 113 outputs association information indicating a result of associating the first text with the second text (step 203).

The language processing apparatus 101 in FIG. 1 is able to associate plural texts written in different languages with each other with high accuracy.

Figure 3:
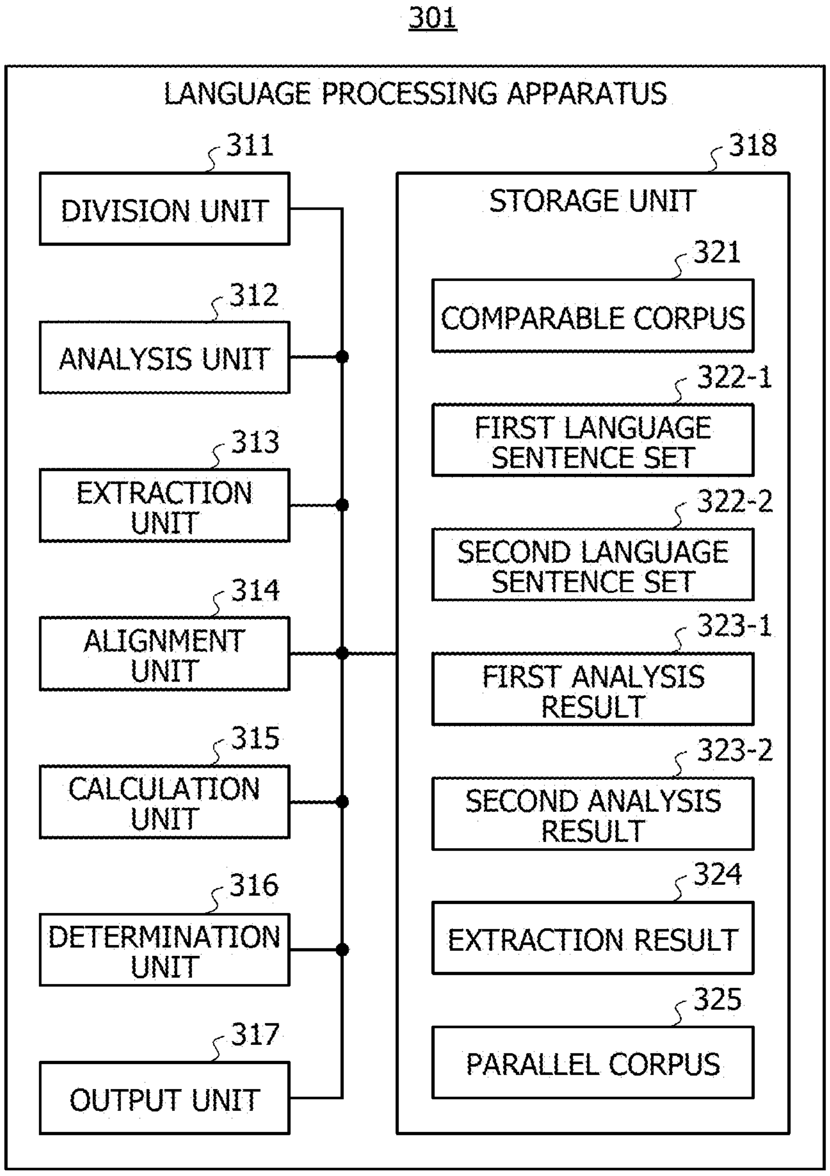
FIG. 3 is a functional configuration diagram illustrating a specific example of the language processing apparatus.

FIG. 3 illustrates a specific example of the language processing apparatus 101 in FIG. 1. A language processing apparatus 301 in FIG. 3 includes a division unit 311, an analysis unit 312, an extraction unit 313, an alignment unit 314, a calculation unit 315, a determination unit 316, an output unit 317, and a storage unit 318. The alignment unit 314 corresponds to the extraction unit 111 in FIG. 1. The calculation unit 315 and the determination unit 316 correspond to the association unit 112 in FIG. 1. The output unit 317 corresponds to the output unit 113 in FIG. 1.

The storage unit 318 stores a comparable corpus 321. The comparable corpus 321 includes multiple first language documents written in a first language and multiple second language documents written in a second language. The first language and the second language are natural languages. Each of the multiple first language documents and one of the multiple second language document concerning the same topic are associated with each other. At least one of the first language and the second language may be a low-resource language.

The division unit 311 generates a first language sentence set 322-1 by dividing any of the first language documents included in the comparable corpus 321 into sentences and stores the first language sentence set 322-1 in the storage unit 318. The division unit 311 generates a second language sentence set 322-2 by dividing the second language document associated with the divided first language document into sentences, and stores the second language sentence set 322-2 in the storage unit 318.

The first language sentence set 322-1 includes M (M is an integer of 1 or more) first language sentences X1(i) (i=1 to M), and the second language sentence set 322-2 includes N (N is an integer of 1 or more) second language sentences X2(j) (j=1 to N). The first language sentence X1(i) is an example of a first text, and the second language sentence X2(j) is an example of a second text.

The analysis unit 312 performs morphological analysis on each sentence X1(i) in the first language sentence set 322-1 to divide the sentence X1(i) into multiple morphemes and generate a first analysis result 323-1, and stores the first analysis result 323-1 in the storage unit 318. The analysis unit 312 performs morphological analysis on each sentence X2(j) in the second language sentence set 322-2 to divide the sentence X2(j) into multiple morphemes and generate a second analysis result 323-2, and stores the second analysis result 323-2 in the storage unit 318. The morphological analysis is an example of natural language processing.

Each of the first analysis result 323-1 and the second analysis result 323-2 includes the multiple morphemes contained in each sentence and information indicating a part of speech or the like of each morpheme. A morpheme may be a word.

The extraction unit 313 performs named entity recognition (NER) on the first analysis result 323-1 of each sentence X1(i) and extracts NE in the first language from the morphemes contained in the first analysis result 323-1. NER is an example of the natural language processing. Hereinafter, the extracted NE in the first language will be denoted by NE1(i). NE1(i) is an example of first NE.

When the first language sentence set 322-1 is generated from a document in a specific expert domain, the extraction unit 313 may extract NE1(i) by performing NER in the specific expert domain.

The alignment unit 314 performs alignment processing on each pair of the sentence X1(i) in the first language sentence set 322-1 and the sentence X2(j) in the second language sentence set 322-2 by using the first analysis result 323-1 and the second analysis result 323-2. The alignment processing includes at least one of word alignment and phrase alignment. The alignment processing is an example of the natural language processing.

By performing the alignment processing, the alignment unit 314 identifies a word or phrase similar to each of multiple words or phrases contained in the sentence X1(i) in each pair, from among words or phrases contained in the sentence X2(j) in the same pair. A phrase includes multiple words.

From among the words or phrases contained in the sentence X2(j), the alignment unit 314 extracts a word or phrase similar to NE1(i) contained in the sentence X1(i) as NE in the second language. Hereinafter, the extracted NE in the second language will be referred to as NE2(j). NE2(j) is an example of second NE.

By performing the alignment processing, the alignment unit 314 obtains an alignment probability between each of the words or phrases contained in the sentence X1(i) and each of the words or phrases contained in the sentence X2(j). The alignment unit 314 generates an extraction result 324 including NE1(i), NE2(j), and alignment information, and stores the extraction result 324 in the storage unit 318.

The alignment information includes the alignment probability between each word contained in NE1(i) and each word contained in NE2(j) or the alignment probability between NE1(i) and NE2(j). Hereinafter, the alignment probability between each word included in NE1(i) and each word included in NE2(j) will be referred to as an alignment probability per word pair in some cases.

To perform the alignment processing makes it possible to extract NE2(j) similar to NE1(i) from the sentence X2(j) with high accuracy, and simultaneously obtain the alignment information on the alignment probability between NE1(i) and NE2(j).

The calculation unit 315 calculates a similarity S1 and a similarity S2 for each pair of the sentence X1(i) in the first language sentence set 322-1 and the sentence X2(j) in the second language sentence set 322-2 by using the first analysis result 323-1, the second analysis result 323-2, and the extraction result 324.

The similarity S1 indicates a similarity between the sentence X1(i) and the sentence X2(j), whereas the similarity S2 indicates a similarity between NE1(i) and NE2(j). An example used as the similarity S1 is a semantic similarity between the sentence X1(i) and the sentence X2(j), whereas an example used as the similarity S2 is a semantic similarity between NE1(i) and NE2(j).

Next, the calculation unit 315 obtains an alignment probability AP between NE1(i) and NE2(j) by using the alignment information included in the extraction result 324. When the alignment probabilities per word pair are included in the alignment information, the calculation unit 315 calculates a statistical value of the alignment probabilities per word pair as the alignment probability AP. As the statistical value, a mean value, a median value, a maximum value, a minimum value, or the like is used.

For example, when the alignment information includes the alignment probability between NE1(i) and NE2(j), the calculation unit 315 uses the above alignment probability as the alignment probability AP. The use of the alignment information obtained by the alignment processing makes it possible to easily obtain the alignment probability AP between NE1(i) and NE2(j).

Next, the calculation unit 315 calculates a similarity S between the sentence X1(i) and the sentence X2(j) by using the similarity S1, the similarity S2, and the alignment probability AP. The similarity S is used as an evaluation index for evaluating a correspondence between the sentence X1(i) and the sentence X2(j).

The determination unit 316 associates the sentence X1(i) with the sentence X2(j) based on a result of comparing the similarity S with a threshold T, generates a parallel corpus 325 including the associated sentences X1(i) and X2(j), and stores the parallel corpus 325 in the storage unit 318. The output unit 317 outputs the generated parallel corpus 325. The parallel corpus 325 is an example of association information indicating a result of associating a first text with a second text.

For example, the calculation unit 315 generates a sentence vector emb(X1(i)) and a sentence vector emb(X2(j)) from the sentence X1(i) and the sentence X2(j), and calculates the similarity S1 in accordance with Formula (1) presented below.

$$S1 = \cos(emb(X1(i)), emb(X2(j))) \tag{1}$$

In Formula (1), cos (emb(X1(i)), emb(X2(j))) expresses a cosine similarity between the sentence vector emb(X1(i)) and the sentence vector emb(X2(j)).

For example, the calculation unit 315 generates an NE vector emb(NE1(i)) and an NE vector emb(NE2(j)) from NE1(i) and NE2(j), and calculates the similarity S2 in accordance with Formula (2) presented below.

$$S2 = \cos(emb(NE1(i)), emb(NE2(j))) \tag{2}$$

As a method of generating a sentence vector or an NE vector from a sentence or NE, for example, Bag of Words, Term Frequency-Inverse Document Frequency (TF-IDF), or distributed representation is used. As the distributed representation, Word2Vec, Global Vectors (Glove), FastText, Bidirectional Encoder Representations from Transformers (BERT), or the like is used.

By using the similarity S1, the similarity S2, and the alignment probability AP, the calculation unit 315 calculates the similarity S3 and the similarity S in accordance with Formulas (3) and (4) presented below.

$$S3 = \mathrm{mean}(S2 * AP) \tag{3}$$

$$S = (1 - p) * S1 + p * S3 \tag{4}$$

In Formula (3), mean(S2*AP) denotes a mean of S2*AP for one or more NE1(i). However, in a case where no NE1(i) is extracted from the sentence X1(i) or where no NE2(j) is extracted from the sentence X2(j), mean(S2*AP) is equal to 0. The similarity S3 in Formula (3) represents a weighted NE similarity with the alignment probability AP used as a weight.

In Formula (4), p is a real number of 0 to 1, both inclusive. For example, a value determined in advance is used as p. Formula (4) represents linear interpolation of the similarity S1 and the similarity S3 using p as an interpolation coefficient. According to Formula (4), the similarity S is calculated by using not only the similarity S1 but also the similarity S3 obtained from the alignment probability AP.

The determination unit 316 adds the sentences X1(i) and X2(j) to the parallel corpus 325 in association with each other if the similarity S is greater than the threshold T, or does not add the pair of the sentences X1(i) and X2(j) to the parallel corpus 325 if the similarity S is equal to or smaller than the threshold T.

The similarity S3 representing the NE similarity between the sentence X1(i) and the sentence X2(j) is calculated by using the alignment probability AP as the weight. Thus, as the alignment probability AP becomes higher, the similarity S3 becomes greater and consequently the similarity S also becomes greater. As the NE similarity becomes greater, the possibility that the sentence X1(i) and the sentence X2(j) indicate the same semantic content becomes higher. Thus, to evaluate the correspondence between these sentences using the similarity S makes it possible to preferentially select a pair of sentences indicating the same semantic content and add the pair of the sentences to the parallel corpus 325.

The use of an appropriate value as the threshold T for the similarity S makes it possible to exclude, from the parallel corpus 325, paired sentences that have a high semantic similarity but do not indicate the same semantic content.

Here, the language processing performed by the language processing apparatus 301 in a case where the first language is English and the second language is Japanese will be described by using specific examples of the sentence X1(i) and the sentence X2(j). First, it is assumed that the following English and Japanese sentences are selected as the sentence X1(i) and the sentence X2(j).

X1(i) Biomedical is so easy.

X2(j) 遺伝学はとても楽なものです。(Genetics is so easy.)

The sentence X1(i) and the sentence X2(j) are the same as the English sentence E1 and the Japanese sentence J1 described above. In this case, the following sentence vector emb(X1(i)) and sentence vector emb(X2(j)) are generated from the sentences X1(i) and X2(j).

$$emb(X1(i)) = [0.76, 0.3, 0.32, \ldots, 0.4]$$

$$emb(X2(j)) = [0.35, 0.05, 0.1, \ldots, 0.15]$$

The similarity S1 is calculated as S1=0.8 from the sentence vector emb(X1(i)) and the sentence vector emb(X2(j)) in accordance with Formula (1).

However, since the sentence X1(i) does not contain NE, NE1(i) and NE2(j) are not extracted. Accordingly, S3=0 holds. In the case where p=0.5, the similarity S is calculated in accordance with Formula (4) as follows.

$$S = (1 - 0.5) * 0.8 + 0.5 * 0 = 0.4 \tag{5}$$

In the case where T=0.7, S<T holds. Therefore, the pair of the sentence X1(i) and the sentence X2(j) is not added to the parallel corpus 325.

Next, it is assumed that the following English and Japanese sentences are selected as the sentence X1(i) and the sentence X2(j).

X1(i) We report a rare case of ischemic heart disease.

X2(j) Soul Disorder のカセットを限定発売します。(We release a Soul Disorder cassette in a limited quantity.)

The sentence X1(i) and the sentence X2(j) are the same as the English sentence E2 and the Japanese sentence J2 described above. In this case, the following sentence vector emb(X1(i)) and sentence vector emb(X2(j)) are generated from the sentences X1(i) and X2(j).

$$emb(X1(i)) = [0.32, 0.94, 0.82, \ldots, 0.53]$$

$$emb(X2(j)) = [0.8, 0.35, 0.73, \ldots, 0.75]$$

The similarity S1 is calculated as S1=0.7 from the sentence vector emb(X1(i)) and the sentence vector emb(X2(j)) in accordance with Formula (1).

Then, "ischemic heart disease" is extracted as NE1(i) from the sentence X1(i), but no NE2(j) is extracted from the sentence X2(j). Accordingly, S3=0 holds. In the case where p=0.5, the similarity S is calculated in accordance with Formula (4) as follows.

$$S = (1 - 0.5) * 0.7 + 0.5 * 0 = 0.35 \tag{6}$$

In the case where T=0.7, S<T holds. Therefore, the pair of the sentence X1(i) and the sentence X2(j) is not added to the parallel corpus 325.

As described above, if NE1(i) or NE2(j) is not extracted, S3=0 holds and the possibility that S<T holds is high. In this way, it is possible to exclude, from the parallel corpus 325, paired sentences that have a high semantic similarity but do not indicate the same semantic content.

Next, it is assumed that the following English and Japanese sentences are selected as the sentence X1(i) and the sentence X2(j).

X1(i) xxx chronic myeloid leukemia xxx BCR-ABL fusion gene.

X2(j) 慢性骨髄性白血病#####BCR-ABL融合遺伝子####. (chronic myeloid leukemia ##### BCR-ABL fusion gene ####.)

Here, "xxx" represents an English word, and "#" represents a Japanese character. In this case, the similarity S1 is calculated as S1=0.9 from the sentence vector emb(X1(i)) and the sentence vector emb(X2(j)) in accordance with Formula (1).

From the sentence X1(i), "chronic myeloid leukemia" and "BCR-ABL fusion gene" are extracted as NE1(i). From the sentence X2(j), "慢性骨髄性白血病" is extracted as NE2(j) that is similar to "chronic myeloid leukemia", and "BCR-ABL融合遺伝子" is extracted as NE2(j) that is similar to "BCR-ABL fusion gene".

In this example, as the alignment probability AP, the mean value of the alignment probabilities between the words contained in NE1(i) and the words contained in NE2(j) is used. Provided that an alignment probability between a word W1 contained in NE1(i) and a word W2 contained in NE2(j) is denoted by P(W1, W2), the alignment probability AP between "chronic myeloid leukemia" and "慢性骨髄性白血病" is calculated in accordance with Formula (7) presented below.

$$\begin{aligned} AP &= (P(\text{chronic}, \text{慢性}) + P(\text{myeloid}, \text{骨髄性}) + P(\text{leukemia}, \text{白血病}))/3 \\ &= (1.0 + 1.0 + 1.0)/3 \\ &= 1.0 \end{aligned} \tag{7}$$

The alignment probability AP between "BCR-ABL fusion gene" and "BCR-ABL融合遺伝子" is calculated in accordance with Formula (8) presented below.

$$AP = (P(BCR-ABL,\ BCR-ABL) + P(\text{fusion},\ \text{融合}) + \tag{8}$$
$$= P(\text{gene},\ \text{遺伝子}))/3$$
$$= (0.9 + 1.0 + 1.0)/3$$
$$= 0.97$$

In this example, the similarity S2 between "chronic myeloid leukemia" and "慢性骨髄 性白血病" is 1.0, and the similarity S2 between "BCR-ABL fusion gene" and "BCR-ABL融合遺伝子" is 1.0. Accordingly, the similarity S3 is calculated in accordance with Formula (3) as follows.

$$S3 = (1.0*1.0 + 1.0*0.97)/2 = 0.985 \tag{9}$$

In the case where p=0.5, the similarity S is calculated in accordance with Formula (4) as follows.

$$S = (1-0.5)*0.9 + 0.5*0.985 = 0.94 \tag{10}$$

When T=0.7, S>T holds. Therefore, the sentences X1(i) and X2(j) are associated with each other and added to the parallel corpus 325.

Next, it is assumed that the following English and Japanese sentences are selected as the sentence X1(i) and the sentence X2(j).

X1(i) xxx chronic myeloid leukemia xxx BCR-ABL fusion gene.

X2(j) CML # # # # # BCR-ABL融合遺伝子 # # # #. (CML # # # # # BCR-ABL fusion gene # # # #.)

In this case, the similarity S1 is calculated as S1=0.9 from the sentence vector emb(X1(i)) and the sentence vector emb(X2(j)) in accordance with Formula (1).

From the sentence X1(i), "chronic myeloid leukemia" and "BCR-ABL fusion gene" are extracted as NE1(i). From the sentence X2(j), "CML" is extracted as NE2(j) that is similar to "chronic myeloid leukemia", and "BCR-ABL融合遺伝子" is extracted as NE2(j) that is similar to "BCR-ABL fusion gene".

In this example, as the alignment probability AP, the mean value of the alignment probabilities between the words contained in NE1(i) and the words contained in NE2(j) is used. Provided that an alignment probability between a word W1 contained in NE1(i) and a word W2 contained in NE2(j) is denoted by P(W1, W2), an alignment probability AP between "chronic myeloid leukemia" and "CML" is calculated in accordance with Formula (11) presented below.

$$AP = (P(\text{chronic},\ CML) + P(\text{myeloid},\ CML) + P(\text{leukemia},\ CML))/3 = (0.3 + 0.3 + 0.3)/3 = 0.3 \tag{11}$$

The alignment probability AP between "BCR-ABL fusion gene" and "BCR-ABL融合遺伝子" is calculated in accordance with Formula (8).

In this example, the similarity S2 between "chronic myeloid leukemia" and "CML" is 1.0, and the similarity S2 between "BCR-ABL fusion gene" and "BCR-ABL融合遺伝子" is 1.0. Accordingly, the similarity S3 is calculated in accordance with Formula (3) as follows.

$$S3 = (1.0*0.3 + 1.0*0.97)/2 = 0.635 \tag{12}$$

In the case where p=0.5, the similarity S is calculated in accordance with Formula (4) as follows.

$$S = (1-0.5)*0.9 + 0.5*0.635 = 0.77 \tag{13}$$

When T=0.7, S>T holds. Therefore, the sentences X1(i) and X2(j) are associated with each other and added to the parallel corpus 325.

As described above, in a case where NE1(i) and NE2(j) are extracted, S3≠0 holds and the possibility that S>T holds is high. Thus, it is possible to add a pair of sentences that are highly likely to indicate the same semantic content to the parallel corpus 325.

The language processing apparatus 301 in FIG. 3 evaluates the correspondence between paired sentences based on the similarity S calculated by using the alignment probabilities AP, and therefore is able to exclude paired sentences not indicating the same semantic content and preferentially associate paired sentences that are highly likely to indicate the same semantic content. Accordingly, sentences written in different languages are associated with each other with high accuracy, and the accuracy of the parallel corpus 325 is improved.

The use of the language processing apparatus 301 makes it possible to easily generate the parallel corpus 325, which is a rare resource, from the comparable corpus 321 in a low-resource language or a specific expert domain.

When a machine translation model is trained by machine learning using the parallel corpus 325 with high accuracy as training data, it is possible to generate the highly-robust machine translation model with less translations missing.

FIG. 4 is a flowchart illustrating an example of second language processing performed by the language processing apparatus 301 in FIG. 3. First, the division unit 311 generates a first language sentence set 322-1 by dividing any of first language documents included in the comparable corpus 321 into sentences (step 401). The division unit 311 generates a second language sentence set 322-2 by dividing the second language document associated with the divided first language document into sentences (step 402).

Next, the analysis unit 312 performs morphological analysis on each sentence X1(i) in the first language sentence set 322-1 to divide the sentence X1(i) into multiple morphemes and generate a first analysis result 323-1 (step 403). The analysis unit 312 performs morphological analysis on each sentence X2(j) in the second language sentence set 322-2 to divide the sentence X2(j) into multiple morphemes and generate a second analysis result 323-2 (step 404).

After that, the extraction unit 313 sets 1 as a control variable i (step 405) and performs NER on the first analysis result 323-1 of the sentence X1(i) to extract NE1(i) (step 406). The extraction unit 313 sets 1 as a control variable j (step 407).

Next, the alignment unit 314 performs the alignment processing on a pair of the sentence X1(i) in the first language sentence set 322-1 and the sentence X2(j) in the second language sentence set 322-2 to extract NE2(j) (step 408). Through the alignment processing in step 408, the alignment information on the alignment probability between NE1(i) and NE2(j) is also obtained at the same time.

Next, the alignment unit 314 generates the extraction result 324 including NE1(i), NE2(j), and the alignment information (step 409).

Next, the calculation unit 315 calculates the similarity S between the sentence X1(i) and the sentence X2(j) in accordance with Formulas (1) to (4) by using the first analysis result 323-1, the second analysis result 323-2, and the extraction result 324 (step 410).

After that, the determination unit 316 compares the similarity S with the threshold T (step 411). When the similarity S is greater than the threshold T (YES in step 411), the determination unit 316 associates the sentence X1(i) with the sentence X2(j) and adds the sentences X1(i) and X2(j) to the parallel corpus 325 (step 412).

Next, the extraction unit 313 compares j with N (step 413). When j is smaller than N (NO in step 413), the extraction unit 313 increments j by 1 (step 416), and the language processing apparatus 301 repeats the processing in step 408 and subsequent steps.

When j reaches N (YES in step 413), the extraction unit 313 compares i with M (step 414). When i is smaller than M (NO in step 414), the extraction unit 313 increments i by 1 (step 417), and the language processing apparatus 301 repeats the processing in step 406 and subsequent steps.

When the similarity S is equal to or smaller than the threshold T (NO in step 411), the language processing apparatus 301 performs the processing in step 413 and subsequent steps. When i reaches M (YES in step 414), the output unit 317 outputs the parallel corpus 325 (step 415).

Instead of Formula (4), the calculation unit 315 may calculate the similarity S by using any one of the following calculation formulas.

$$S = w * S1 + v * S3 \quad (21)$$

$$S = (S1 * S3)\hat{}(1 - q) \quad (22)$$

$$S = (2 * S1 * S3)/(S1 + S3) \quad (23)$$

$$S = (S1\hat{}r) * (S3\hat{}(1 - r)) \quad (24)$$

$$S = (1 - m) * (1 - t) * S1 + (1 - m) * t * S3 + m * S3 \quad (25)$$

$$S = (1/2) * (S1 + S3) + (1/2) * (S1 - S3) * \log((1 - s)/(1 + s)) \quad (26)$$

$$S = a * S1\hat{}c + b * S3\hat{}d \quad (27)$$

In Formula (21), w and v denote predetermined weighting coefficients. Formula (21) represents a weighted addition of the similarity S1 and the similarity S3.

In Formula (22), "q" denotes a predetermined scale factor. Formula (22) represents a geometric mean of the similarity S1 and the similarity S3.

Formula (23) represents a harmonic mean of the similarity S1 and the similarity S3.

In Formula (24), r denotes a predetermined weight parameter. Formula (24) represents interpolation using a power of the similarity S1 and a power of the similarity S3.

In Formula (25), t denotes a real number of 0 to 1, both inclusive, and m denotes a predetermined margin parameter. Formula (25) represents linear interpolation of the similarity S1 and the similarity S3 using the margin parameter.

In Formula (26), "s" denotes a predetermined parameter. Formula (26) represents interpolation of the similarity S1 and the similarity S3 using a logarithmic function.

In Formula (27), a and b denote predetermined coefficients and c and d denote predetermined parameters. Formula (27) represents interpolation of the similarity S1 and the similarity S3 using a polynomial.

Instead of the cosine similarity of vectors, the calculation unit 315 may calculate the similarity S1 and the similarity S2 by using any one of the following indexes or models.

(1) Jaccard Similarity
(2) Dot Product
(3) Dice Coefficient
(4) Pearson Correlation Coefficient
(5) Spearman's Correlation Coefficient
(6) Euclidean Distance
(7) Squared Euclidean Distance
(8) Normalized Euclidean Distance
(9) L2 Norm
(10) Canberra Distance
(11) Chebyshev Distance
(12) Minkowski Distance
(13) Mahalanobis Distance
(14) Jensen-Shannon Distance
(15) Chi-Square Distance
(16) Levenshtein Distance
(17) Hamming Distance
(18) Jaccard/Tanimoto Distance
(19) Language-Agnostic Sentence Representations (LASER)
(20) Language-Agnostic BERT Sentence Embedding (LaBSE)

Instead of sentences, the language processing apparatus 301 may perform the language processing by using paragraphs each including multiple sentences as the first text and the second text.

The configurations of the language processing apparatus 101 in FIG. 1 and the language processing apparatus 301 in FIG. 3 are merely examples. The language processing apparatus may have some of components omitted or modified depending on an application or conditions of the language processing apparatus. For example, the division unit 311 and the analysis unit 312 may be omitted in the language processing apparatus 301 in FIG. 3 when the first analysis result 323-1 and the second analysis result 323-2 are generated by an external apparatus.

Figure 4A:
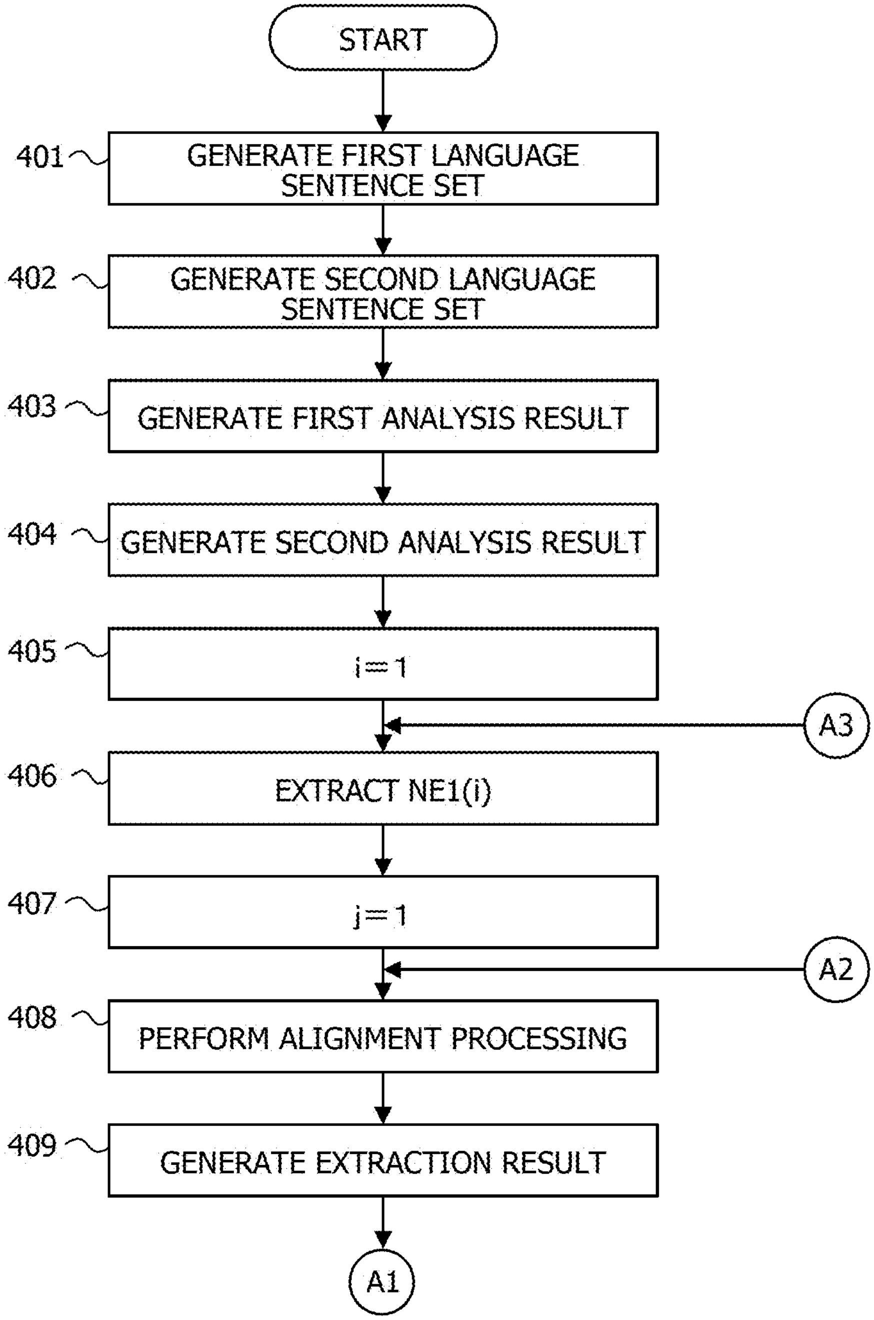
FIG. 4A is a flowchart (part 1) of second language processing.
Figure 4B:
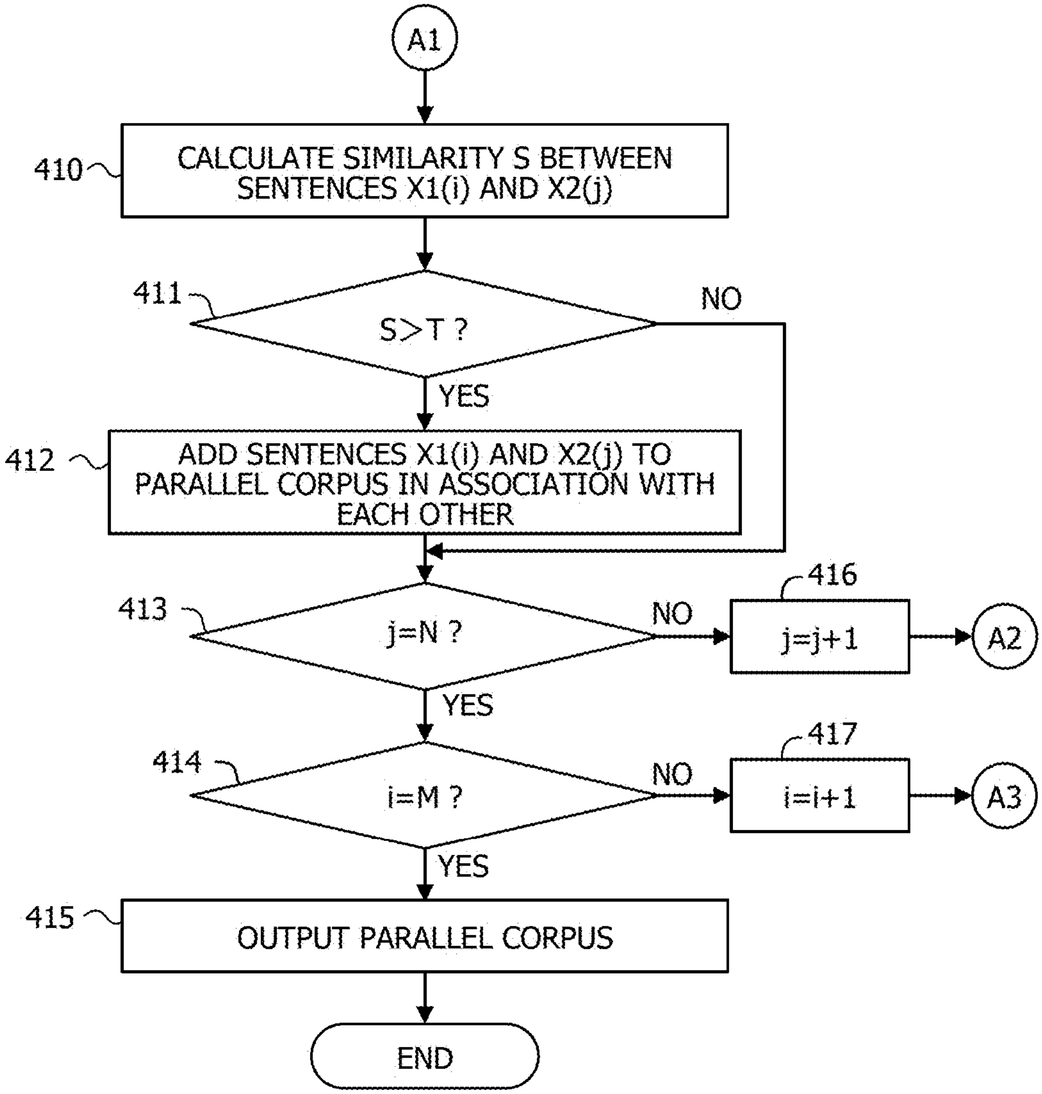
FIG. 4B is a flowchart (part 2) of the second language processing.

The flowcharts in FIGS. 2, 4A, and 4B are merely examples, and some portions of the processing may be omitted or modified depending on the configuration or conditions of the language processing apparatus. For example, the processing in steps 401 to 404 in FIG. 4A may be omitted in the language processing apparatus 301 in FIG. 3 when the first analysis result 323-1 and the second analysis result 323-2 are generated by an external apparatus.

Formulas (1) to (13) and (21) to (27) are merely examples, and the language processing apparatus 301 may perform the language processing by using other calculation formulas.

Figure 5:
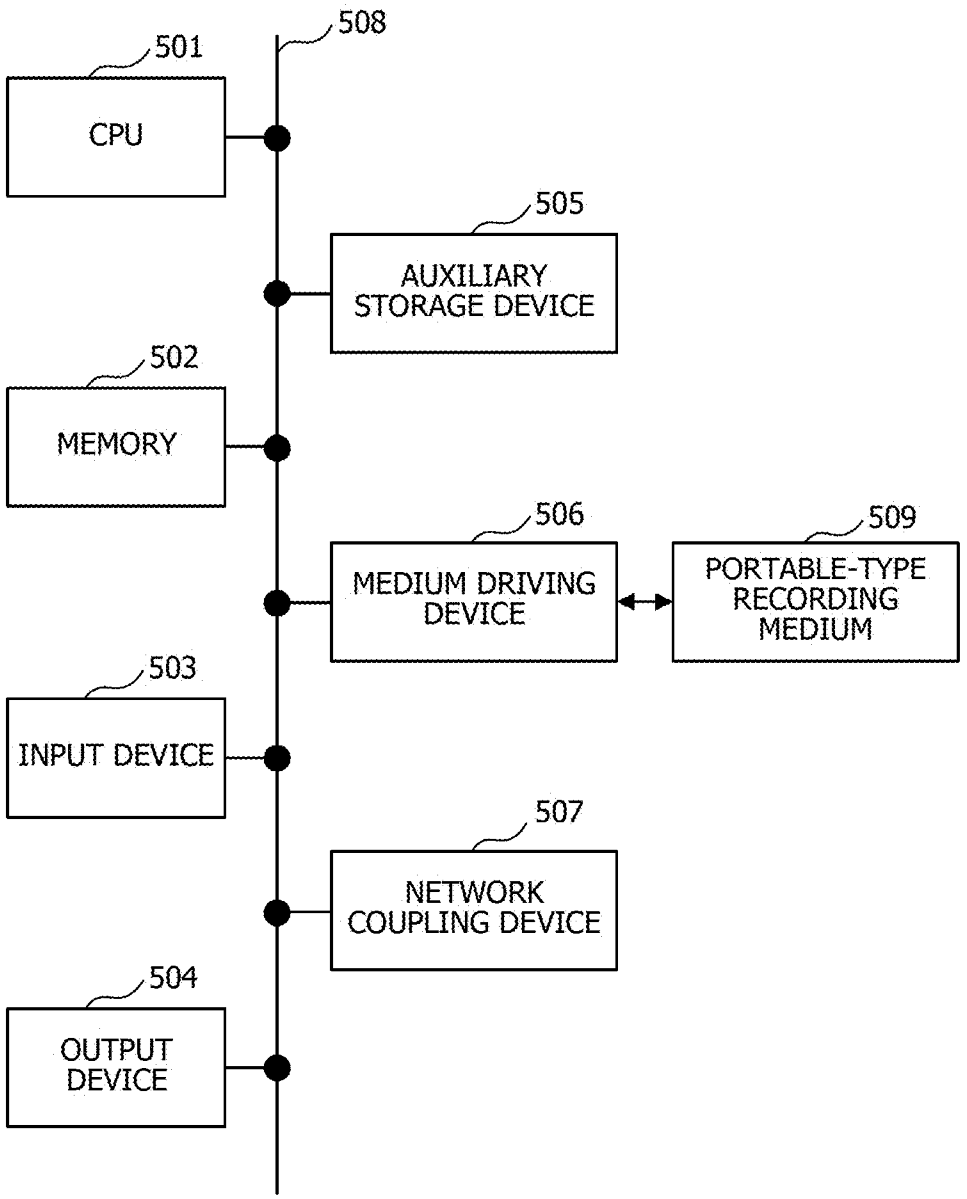
FIG. 5 is a hardware configuration diagram of an information processing apparatus.

FIG. 5 illustrates a hardware configuration example of an information processing apparatus (computer) used as the language processing apparatus 101 in FIG. 1 and the language processing apparatus 301 in FIG. 3. The information processing apparatus in FIG. 5 includes a central processing unit (CPU) 501, a memory 502, an input device 503, an output device 504, an auxiliary storage device 505, a medium driving device 506, and a network coupling device 507. These components are pieces of hardware, and are coupled to each other by a bus 508.

The memory 502 is, for example, a semiconductor memory such as a read-only memory (ROM) or a randomaccess memory (RAM), and stores a program and data used for processing. The memory 502 may operate as the storage unit 318 in FIG. 3.

The CPU 501 (processor) operates as the extraction unit 111 and the association unit 112 in FIG. 3 by, for example, executing a program using the memory 502. The CPU 501 also operates as the division unit 311, the analysis unit 312, the extraction unit 313, the alignment unit 314, the calculation unit 315, and the determination unit 316 in FIG. 3 by executing the program using the memory 502.

For example, the input device 503 is a keyboard, a pointing device, or the like, and is used to input information or an instruction from a user or operator. For example, the output device 504 is a display device, a printer, or the like, and is used to output a processing result and an inquiry or instruction to the user or operator. The output device 504 may operate as the output unit 113 in FIG. 1 or the output unit 317 in FIG. 3, and the processing result may be the parallel corpus 325.

The auxiliary storage device 505 is, for example, a magnetic disk device, an optical disk device, a magneto-optical disk device, a tape device, or the like. The auxiliary storage device 505 may be a hard disk drive or a solid-state drive (SSD). The information processing apparatus may store a program and data in the auxiliary storage device 505, and may use the program and data by loading the program and data into the memory 502. The auxiliary storage device 505 may operate as the storage unit 318 in FIG. 3.

The medium driving device 506 drives a portable-type recording medium 509, and accesses contents recorded therein. The portable-type recording medium 509 is a memory device, a flexible disk, an optical disk, a magneto-optical disk, or the like. The portable-type recording medium 509 may be a compact disk read-only memory (CD-ROM), a Digital Versatile Disk (DVD), a Universal Serial Bus (USB) memory, or the like. The user or operator may store a program and data in the portable-type recording medium 509, and may use the program and data by loading the program and data into the memory 502.

As described above, a computer-readable recording medium in which the program and data for use in the processing are stored is a physical (non-transitory) recording medium such as the memory 502, the auxiliary storage device 505, or the portable-type recording medium 509.

The network coupling device 507 is a communication interface circuit that is coupled to a communication network such as a wide area network (WAN) or a local area network (LAN) and performs data conversion associated with communication. The information processing apparatus may receive a program and data from an external apparatus via the network coupling device 507, and may use the program and data by loading the program and data into the memory 502. The network coupling device 507 may operate as the output unit 113 in FIG. 1 or the output unit 317 in FIG. 3.

The information processing apparatus does not have to include all the components in FIG. 5, and may have some of the components omitted or modified depending on an application or conditions of the information processing apparatus. For example, in a case where an interface with the user or operator may not be used, the input device 503 and the output device 504 may be omitted. In a case where the portable-type recording medium 509 or the communication network is not used, the medium driving device 506 or the network coupling device 507 may be omitted.

Although the disclosed embodiment and its advantages have been described in detail, those skilled in the art may be able to make various changes, additions, and omissions without deviating from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a language processing program for causing a computer to execute a process comprising:

extracting, from a second text written in a second language, a second named entity corresponding to a first named entity contained in a first text written in a first language;

associating the first text with the second text based on a combination of a similarity between the first named entity and the second named entity and an alignment probability between the first named entity and the second named entity; and outputting association information indicating a result of associating the first text with the second text, the associating the first text with the second text includes calculating an evaluation index for evaluating a correspondence between the first text and the second text based on the combination of the similarity and the alignment probability, and associating the first text with the second text based on a result of comparing the evaluation index with a threshold.

2. The non-transitory computer-readable recording medium according to claim 1, wherein the extracting the second named entity from the second text includes extracting, as the second named entity, one or more words similar to the first named entity from among a plurality of words contained in the second text, and obtaining an alignment probability between a word contained in the first named entity and a word contained in the second named entity, and the associating the first text with the second text includes calculating a statistical value of an alignment probability between the word contained in the first named entity and the word contained in the second named entity as the alignment probability between the first named entity and the second named entity.

3. The non-transitory computer-readable recording medium according to claim 1, wherein the calculating of the evaluation index includes calculating a sentence similarity between the first sentence and the second sentence by using a sentence vector generated from the first text and a sentence vector generated from the second text; and calculating the evaluation index for evaluating a correspondence between the first text and the second text by using a combination of the similarity and the alignment probability and the sentence similarity.

4. The non-transitory computer-readable recording medium according to claim 1, wherein at least one of the first language and the second language is a low-resource language.

5. A language processing apparatus comprising:
- a memory; and
- a processor coupled to the memory, the processor being configured to perform processing comprising:
- extracting, from a second text written in a second language, a second named entity corresponding to a first named entity contained in a first text written in a first language;
- associating the first text with the second text based on a combination of a similarity between the first named entity and the second named entity and an alignment probability between the first named entity and the second named entity; and
- outputting association information indicating a result of associating the first text with the second text,
- the associating the first text with the second text includes
- calculating an evaluation index for evaluating a correspondence between the first text and the second text based on the combination of the similarity and the alignment probability, and
- associating the first text with the second text based on a result of comparing the evaluation index with a threshold.

6. The language processing apparatus according to claim 5, wherein the extracting of the second named entity from the second text includes:
- extracting, as the second named entity, one or more words similar to the first named entity from among a plurality of words contained in the second text;
- obtaining an alignment probability between a word contained in the first named entity and a word contained in the second named entity; and
- calculating a statistical value of an alignment probability between the word contained in the first named entity and the word contained in the second named entity as the alignment probability between the first named entity and the second named entity.

7. The language processing apparatus according to claim 5, wherein the calculating of the evaluation index:
- calculating a sentence similarity between the first sentence and the second sentence by using a sentence vector generated from the first text and a sentence vector generated from the second text; and
- calculating the evaluation index for evaluating a correspondence between the first text and the second text by using a combination of the similarity and the alignment probability and the sentence similarity.

8. The language processing apparatus according to claim 5, wherein at least one of the first language and the second language is a low-resource language.

9. A language processing method for causing a computer to execute a process comprising:
- extracting, from a second text written in a second language, a second named entity corresponding to a first named entity contained in a first text written in a first language;
- associating the first text with the second text based on a combination of a similarity between the first named entity and the second named entity and an alignment probability between the first named entity and the second named entity; and
- outputting association information indicating a result of associating the first text with the second text,
- the associating the first text with the second text includes
- calculating an evaluation index for evaluating a correspondence between the first text and the second text based on the combination of the similarity and the alignment probability, and
- associating the first text with the second text based on a result of comparing the evaluation index with a threshold.

10. The language processing method according to claim 9, wherein
- the extracting the second named entity from the second text includes
- extracting, as the second named entity, one or more words similar to the first named entity from among a plurality of words contained in the second text, and
- obtaining an alignment probability between a word contained in the first named entity and a word contained in the second named entity, and
- the associating the first text with the second text includes calculating a statistical value of an alignment probability between the word contained in the first named entity and the word contained in the second named entity as the alignment probability between the first named entity and the second named entity.

11. The language processing method according to claim 9, wherein the calculating of the evaluation index includes
- calculating a sentence similarity between the first sentence and the second sentence by using a sentence vector generated from the first text and a sentence vector generated from the second text; and
- calculating the evaluation index for evaluating a correspondence between the first text and the second text by using a combination of the similarity and the alignment probability and the sentence similarity.

12. The language processing method according to claim 9, wherein at least one of the first language and the second language is a low-resource language.

* * * * *